E. G. LATTA & M. E. HERRMANN.
TYPE BAR BEARING FOR TYPE WRITING MACHINES.
APPLICATION FILED MAR. 18, 1908.
977,201. Patented Nov. 29, 1910.
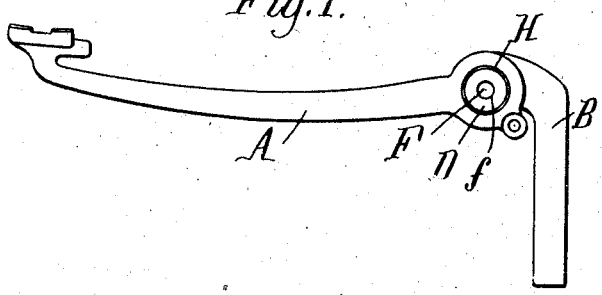
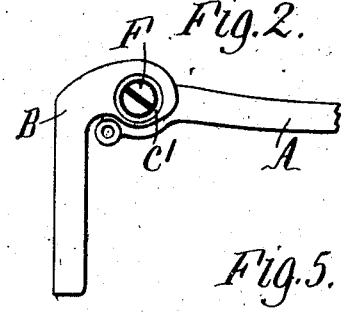
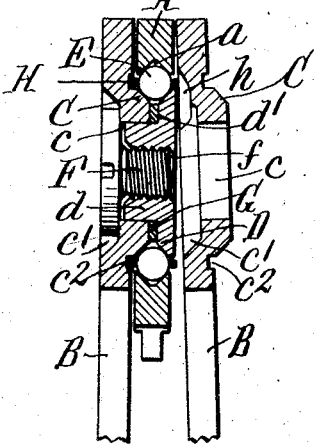
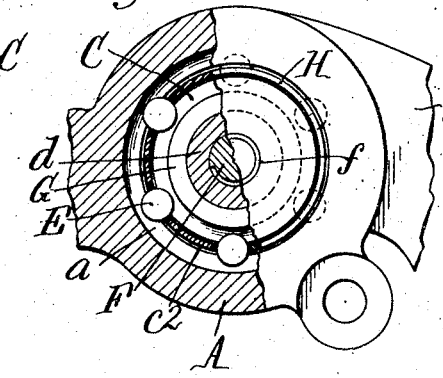
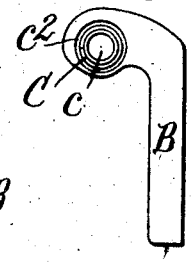
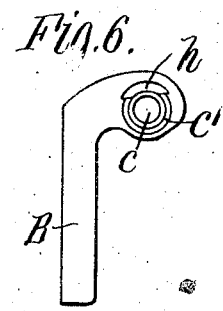
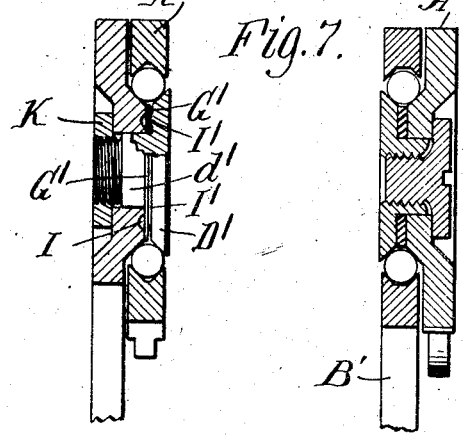
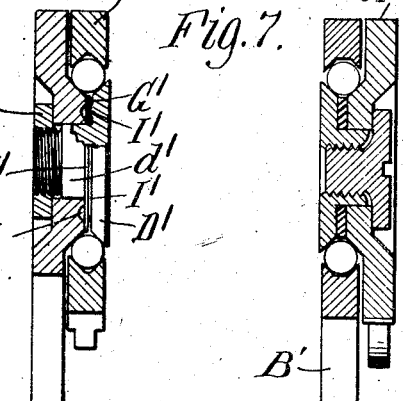
Witnesses:
E. A. Volk.
A. G. Dimond.
Inventors
Emmit G. Latta
Max E. Herrmann
by Wilhelm, Parker & Hard
Attorneys.

UNITED STATES PATENT OFFICE.

EMMIT G. LATTA AND MAX E. HERRMANN, OF SYRACUSE, NEW YORK, ASSIGNORS TO SAID LATTA AND HARVEY A. MOYER, OF SYRACUSE, NEW YORK.

TYPE-BAR BEARING FOR TYPE-WRITING MACHINES.

977,201.
Specification of Letters Patent.
Patented Nov. 29, 1910.

Application filed March 18, 1908. Serial No. 421,873.

*To all whom it may concern:*

Be it known that we, EMMIT G. LATTA and MAX E. HERRMANN, citizens of the United States, residing at Syracuse, in the county of Onondaga and State of New York, have invented a new and useful Improvement in Type-Bar Bearings for Type-Writing Machines, of which the following is a specification.

This invention relates more particularly to ball bearing pivot supports for type-bars adapted for use in front strike or visible typewriting machines. In machines of this sort the type-bars are ordinarily pivoted in the arc of a circle and must be closely arranged to accommodate the requisite number of type. This necessitates bearings which are very compact or thin in the direction of their axes, or crosswise of the machine, while nevertheless the construction must be such as to allow very free action of the type-bars without lateral play or motion to insure perfect writing, and as the bearings are subject to severe work it is desirable to have the parts as few and as strong as possible and to make provision for adjusting the bearing to compensate for wear. Locking devices are required to hold the adjustable part in adjusted positions and these usually add to the complication and size of the bearing and the cost of manufacture thereof.

The object of this invention is to provide a ball bearing of compact, simple, strong and durable construction which can be manufactured with great precision at small expense by the exercise of ordinary care, and in which the opposable bearing cones for the balls are held in a perfectly concentric and parallel relation and which can be adjusted and the adjustment maintained without disturbing such relation of the cones, so as to insure freedom of action of the type-bars without lateral motion.

In the accompanying drawings: Figure 1 is a side elevation, full size, of a type-bar and hanger with a ball bearing joint embodying the invention. Fig. 2 is a fragmentary reverse side elevation thereof. Fig. 3 is a transverse sectional elevation thereof, on an enlarged scale. Fig. 4 is a fragmentary side elevation, partly in section, thereof, on an enlarged scale. Fig. 5 is an elevation of the hanger detached, showing the inside thereof, or side next to the type-bar. Fig. 6 is an elevation of the hanger showing the other side thereof. Fig. 7 is a transverse sectional elevation, on an enlarged scale, of a modified construction. Fig. 8 is a transverse sectional elevation, on an enlarged scale, of another modification.

Like letters of reference refer to like parts in the several figures.

A represents a type-bar, which can be of known construction, provided at its inner or bearing end with a circular hole having an internal ball groove $a$ of suitable shape; B a bearing hanger therefor provided with a suitable shank for fastening it in the machine; C and D opposable fixed and adjustable cones which are supported by the hanger and extend into the hole of the type-bar, forming with the ball groove $a$ a raceway for the bearing balls, which are shown at E.

In the construction shown in Figs. 1–6, the bearing end of the hanger B is provided on one side with an integral conical boss which forms the fixed bearing cone C and with a transverse cylindrical hole $c$ concentric with said cone, and it is also preferably provided on the other side opposite to the cone with a circular recess or depression $c'$. The hanger is preferably stamped from sheet metal and pressed into the shape shown by suitable dies, after which the bearing face of the cone C is finished and the hole $c$ reamed by the same tool, which makes these parts true and perfectly concentric with each other. An annular groove $c^2$ is also preferably made in the hanger at the base of the fixed cone, either by the forming dies or the finishing tool, for the reception of a ball retainer hereinafter referred to.

The adjustable cone D is provided with a central cylindrical shank $d$ exactly concentric with its conical bearing face, which fits and is secured in the cylindrical hole of the hanger, and with an annular locking face $d'$ perpendicular to the axis of the cone between its bearing face and securing shank. A securing and adjusting screw F passing through the hole in the hanger into a threaded central hole $f$ in the shank of the adjustable cone secures the same to the hanger. The head of this screw occupies the depression $c'$ of the hanger so that a large head can be provided without projecting beyond the outer face of the hanger.

G represents a locking washer or annulus which surrounds the shank of the adjustable cone between the locking face $d'$ thereof and the opposable end face of the fixed cone C. This washer is preferably a flat-sided annular disk of copper or other relatively soft metal or other suitable material adapted to be compressed somewhat between the cones, and adapted by its frictional contact with the locking faces of the cones to hold the adjustable cone from turning and working loose.

After loosely assembling the parts of the bearing it is placed in a special screw press or machine between parts which bear only on the hanger and adjustable cone, and the locking washer is compressed until the cones are brought to the exact adjustment required, which can be readily ascertained by manipulating the type-bar while the bearing is still held in the press. The screw F is then driven in with sufficient force to hold the parts securely in this adjustment before the bearing is removed from the press, by a suitable screw driver located in the press. The adjustable cone described can be made in an automatic screw machine and is therefore inexpensive to manufacture. The hanger made as described is also inexpensive, and the locking washer is simply a sheet metal stamping so that the bearing, as a whole, is simple and can be manufactured cheaply. As the hole in the fixed cone is made by the same tool that finishes the cone, and the shank of the adjustable cone by the same tool that makes this cone, these parts fit accurately one within the other exactly concentric with the axis of the bearing and hold the cones exactly concentric and parallel with each other. The locking washer, being compressible, permits the adjustable cone to be set nearer to the fixed cone by tightening up the adjusting screw F from time to time as may be necessary to take up any looseness due to wear in the bearing, and as the washer is flat-sided and bears against the parallel locking faces of the cones, which are made accurately perpendicular to the axis of the bearing, it coöperates with the cylindrical shank of the adjustable cone in preventing displacement of the cone, or insures the cones remaining parallel after repeated adjustments of the bearing. The screw F may be eccentric in the bearing or loose fitting and not have any bad effect on the action of the bearing. It has been found extremely difficult in practice to produce perfectly true type-bar bearings narrow enough for use in front strike machines and having a cone which can be adjusted and securely locked in different adjusted positions without tilting or throwing the adjustable cone off the center, but the simple and inexpensive bearing above described accomplishes these results, the importance of which will be appreciated when it is remembered that if the cones are not perfectly concentric and parallel they will pinch the balls at some point and cannot be adjusted to prevent a slight lateral motion of the type-bar, and such play in the bearing is magnified many times at the end of the type-bar which makes the impression. The locking devices heretofore used for these small bearings, of which we are aware, have either been expensive and impractical to manufacture, or they have been of such construction that if made large enough to afford the necessary strength they have added so much to the axial length of the bearings as to make them unsuitable for front strike machines. The thin compressible locking washer G arranged as described, however, only occupies the space which is necessarily left between the cones to allow of the adjustment thereof and therefore does not add appreciably to the length of the bearing, while at the same time a securing screw of large diameter and greater length than the thickness of the type-bar or hanger can be used, and great force can be applied to the screw without danger of stripping its threads. The adjustable cone does not require slotting or other mutilation for the engagement of a tool for holding or turning it in adjusting the bearing. It is held from turning by the press when driving in the screw to secure the parts of the bearing, and when at any future time the bearing requires adjustment it can be done by simply taking the bearing out of the typewriter and holding it with the adjustable cone on some solid support and driving in the screw with an ordinary screw driver. The friction between the locking washer and cone will hold the cone from turning with the screw. The cone therefore is of symmetrical circular cross section and of uniform thickness all around and is not prone to distortion in hardening, which is a serious objection to cones which are slotted or recessed or have parts of different shape and thickness, not that all such cones will be imperfect, but so many of them have to be discarded that the expense of manufacture of the bearings is materially increased.

An endless flat-sided locking washer, such as described, is preferred, but a small soft metal wire bent into ring form with its ends abutting gives good results.

H, Figs. 3 and 4, represents a ball retainer, preferably consisting of a short thin tube surrounding the cones with its inner end entering the groove $c^2$ in the hanger and having holes in which the balls are confined. The outer end of the ball retainer projects slightly beyond the side of the type-bar, and a small notch $h$, Figs. 3 and 6, can be made in the outer face of each hanger to receive the projecting end of the retainer of the adjoining bearing and thus permit a closer arrangement of the bearings. The notches $h$ are only required, if at all, in a few hangers at the middle portion of the segment where the bearings must be closer than at the sides of the segment. The ball retainer can be used or not, as desired.

In the construction shown in Fig. 7, a locking washer or annulus $G'$ of thin spring metal is used, and one of the cones, for instance, the fixed one, is provided at one side of the washer with an annular groove $I$, while the other cone has an annular rib $I'$ opposite to the groove. When the adjustable cone is forced into position the rib springs the washer into the groove, thus forming a yielding stop for the adjustable cone that answers the same purpose as the compressible washer first described. The chief advantage of this spring washer is that in case the cone is forced in far enough to prevent free action of the bearing, it can be backed off again to ease up the bearing and the washer will still hold the adjustable cone from turning, while with the compressible washer it is best, in such case, to replace the compressed washer with a new one. In this construction the adjustable cone has a screw-threaded stem passing through the hole in the hanger and secured by a nut $K$ located in the depression of the hanger in place of the screw engaging in the threaded hole in the cone, as in the first construction. The adjustable cone $D'$, as in the first construction, has a cylindrical shank $d'$ fitting in the cylindrical hole in the hanger to retain the cones concentric and parallel. No ball retainer is shown in this construction but one could be provided if desired.

In both of the constructions illustrated the cones are carried by the hanger and enter the internally grooved hole in the type-bar, but a manifest reversal of this construction would be to provide the hanger with the grooved hole and the type-bar with the cones, as illustrated in Fig. 8, in which $A'$ indicates the type-bar and $B'$ the bearing hanger.

We claim as our invention:

1. The combination of a type-bar and a hanger, one of which parts has an internal ball groove, a fixed cone and an adjustable cone supported by said other part, bearing balls, said adjustable cone having a concentric shank slidably fitting in a hole in the part supporting said cones, an annular yielding locking device between opposing annular portions of said cones, and a screw device for forcing said adjustable cone toward the fixed cone against said locking device, substantially as set forth.

2. The combination of a type-bar and a hanger, one of which parts has an internal ball groove, a fixed cone and an adjustable cone supported by said other part, bearing balls, said adjustable cone having a smooth concentric cylindrical shank slidably fitting in a cylindrical hole in said part supporting said cones concentric with the fixed cone, an annular yielding locking device surrounding said shank between opposing annular portions of said cones, and a screw device for forcing said adjustable cone toward the fixed cone against said locking device, substantially as set forth.

3. The combination of a type-bar and a hanger, one of which parts has an internal ball groove, said other part having an integral cone on one side and a smooth cylindrical hole concentric with said cone, an adjustable cone having a smooth concentric cylindrical shank fitting in said cylindrical hole, bearing balls, an annular locking device surrounding said shank between opposing annular portions of said cones, and a screw for forcing said adjustable cone toward said fixed cone against said locking device, substantially as set forth.

4. The combination of a type-bar and a hanger, one of which parts has an internal ball groove, said other part having an integral cone on one side, a depression on the opposite side and a smooth cylindrical hole concentric with said cone, an adjustable cone having a smooth concentric cylindrical shank fitting in said cylindrical hole, bearing balls, an annular locking device between opposing annular portions of said cones, and a device seated in said depression and having a screw-threaded engagement with said adjustable cone, substantially as set forth.

5. The combination of a type-bar and a hanger, one of which parts has an internal ball groove, said other part having an integral cone on one side and a smooth surfaced hole concentric with said cone, an adjustable cone having a smooth surfaced shank slidably fitting in said hole, bearing balls, an annular device arranged between opposite annular portions of said cones for holding said adjustable cone from turning, and means located inside of the circle of said holding device for drawing said cones together against opposite sides of said holding device, substantially as set forth.

6. The combination of a type-bar and a hanger, one of which parts has an internal ball groove, said other part having an integral cone on one side, a depression on the opposite side and a smooth cylindrical hole concentric with said cone, an adjustable cone having a smooth concentric cylindrical shank fitting in said cylindrical hole and having a screw-threaded hole, bearing balls, a screw having a threaded engagement with the threaded hole in said adjustable cone with its head seated in said depression, and means for holding said adjustable cone from turning, substantially as set forth.

7. The combination of a type-bar having an internal ball groove, a hanger having an integral cone on one side, a depression in the opposite side and a smooth cylindrical hole concentric with said cone, an adjustable cone having a smooth cylindrical shank fitting in said cylindrical hole and provided with a screw-threaded hole, bearing balls, a screw having a threaded engagement with said screw-threaded hole and a head seated in said depression, and means arranged between said cones for locking the adjustable cone from turning, substantially as set forth.

8. The combination of a type-bar having an internal ball groove, a hanger having an integral cone on one side and a smooth cylindrical hole concentric with said cone, an adjustable cone having a concentric smooth cylindrical shank fitting in said hole and an annular locking face opposite the apex of the first cone, bearing balls, a yielding annular locking device arranged between said annular locking face of the adjustable cone and the apex of the first cone, and means for drawing said cones together and compressing said locking device, substantially as set forth.

9. The combination of a type-bar having an internal ball groove, a hanger having an integral cone on one side and a smooth cylindrical hole concentric with said cone, an adjustable cone having a concentric smooth cylindrical shank fitting in said hole, said adjustable cone and shank being of smooth unbroken circular form and of uniform thickness on all sides of the apexes, bearing balls, and means for securing said cones together and holding said adjustable cone from turning, substantially as set forth.

Witness our hands, this 11th day of March, 1908.

EMMIT G. LATTA.
MAX E. HERRMANN.

Witnesses:
FRANK E. REID,
OTTO A. SCHILLY.